(12) United States Patent
Locasto et al.

(10) Patent No.: US 9,338,174 B2
(45) Date of Patent: *May 10, 2016

(54) SYSTEMS AND METHODS FOR INHIBITING ATTACKS ON APPLICATIONS

(71) Applicant: The Trustees of Columbia University in the City of New York, New York, NY (US)

(72) Inventors: Michael E Locasto, Springfield, VA (US); Salvatore J Stolfo, Ridgewood, NJ (US); Angelos D Keromytis, New York, NY (US); Ke Wang, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/272,187

(22) Filed: May 7, 2014

(65) Prior Publication Data

US 2015/0264058 A1 Sep. 17, 2015

Related U.S. Application Data

(63) Continuation of application No. 12/297,730, filed as application No. PCT/US2006/015080 on Apr. 21, 2006, now Pat. No. 8,763,103.

(51) Int. Cl.
*H04L 29/06* (2006.01)

(52) U.S. Cl.
CPC ........ *H04L 63/1408* (2013.01); *H04L 63/1416* (2013.01)

(58) Field of Classification Search
CPC ............ H04L 63/1416; H04L 63/1408; H04L 63/0815; G06F 21/41
See application file for complete search history.

(56) References Cited

U.S. PATENT DOCUMENTS

| 6,715,084 | B2 | 3/2004 | Aaron et al. |
| 7,263,690 | B1 | 8/2007 | Shapiro |
| 7,624,449 | B1 * | 11/2009 | Perriot ........................... 726/24 |
| 7,840,968 | B1 * | 11/2010 | Sharma et al. ................ 719/313 |

(Continued)

FOREIGN PATENT DOCUMENTS

| WO | WO/99/55052 | 10/1999 |
| WO | WO/99/63727 | 12/1999 |

OTHER PUBLICATIONS

Zhou et al., AccMon: Automatically Detecting Memory-related Bugs via Program Counter-based Invariants, Dec. 2004, 37th International Symposium on Microarchitecture, pp. 269-280.*

(Continued)

*Primary Examiner* — Kenneth Chang
(74) *Attorney, Agent, or Firm* — Byrne Poh LLP

(57) ABSTRACT

In accordance with some embodiments of the present invention, systems and methods that protect an application from attacks are provided. In some embodiments of the present invention, input from an input source, such as traffic from a communication network, can be routed through a filtering proxy that includes one or more filters, classifiers, and/or detectors. In response to the input passing through the filtering proxy to the application, a supervision framework monitors the input for attacks (e.g., code injection attacks). The supervision framework can provide feedback to tune the components of the filtering proxy.

17 Claims, 5 Drawing Sheets

(56) References Cited

U.S. PATENT DOCUMENTS

| | | | |
|---|---|---|---|
| 7,975,059 | B2 | 7/2011 | Wang et al. |
| 8,214,900 | B1 | 7/2012 | Satish et al. |
| 8,407,785 | B2 | 3/2013 | Sidiroglou et al. |
| 8,701,189 | B2 | 4/2014 | Saraf et al. |
| 2001/0020255 | A1 | 9/2001 | Hofmann et al. |
| 2002/0066034 | A1 | 5/2002 | Schlossberg et al. |
| 2002/0078382 | A1 | 6/2002 | Sheikh et al. |
| 2002/0083175 | A1 | 6/2002 | Afek et al. |
| 2002/0162026 | A1 | 10/2002 | Neuman et al. |
| 2003/0145225 | A1 | 7/2003 | Bruton, III et al. |
| 2003/0204632 | A1 | 10/2003 | Willebeek-LeMair et al. |
| 2004/0044912 | A1 | 3/2004 | Connary et al. |
| 2004/0098618 | A1 | 5/2004 | Kim et al. |
| 2004/0128543 | A1 | 7/2004 | Blake et al. |
| 2004/0148520 | A1 | 7/2004 | Talpade et al. |
| 2005/0071655 | A1 | 3/2005 | de Jong |
| 2006/0123244 | A1* | 6/2006 | Gheorghescu et al. ....... 713/188 |
| 2006/0143688 | A1 | 6/2006 | Futoransky et al. |
| 2006/0143709 | A1 | 6/2006 | Brooks et al. |
| 2008/0235764 | A1 | 9/2008 | Cohen et al. |
| 2008/0313734 | A1 | 12/2008 | Rozenberg et al. |
| 2009/0037682 | A1 | 2/2009 | Armstrong et al. |
| 2009/0038008 | A1 | 2/2009 | Pike |
| 2010/0037038 | A1 | 2/2010 | Bieswanger et al. |
| 2012/0167120 | A1 | 6/2012 | Hentunen |

OTHER PUBLICATIONS

Baecher, P. and Koetter, M., "libemu", Jul. 22, 2011, pp. 1-6, available at: http://libemu.carnivore.it/.
Baumgartner, K., "The ROP Pack", Abstract, In Proceedings of the 20th Virus Bulletin International Conference, Vancouver, BC, CA, Sep. 29-Oct. 1, 2010, pp. 1.
Baumgartner, K., "The ROP Pack", Presentation, In Proceedings of the 20th Virus Bulletin International Conference, Vancouver, BC, CA, Sep. 29-Oct. 1, 2010, pp. 1-43.
Buchanan, E., et al., "Return-Oriented Programming: Exploits Without Code Injection", Presentation, Black Hat USA, Las Vegas, NV, US, Aug. 2-7, 2008, pp. 1-53.
Checkoway, S., et al., "Return-Oriented Programming Without Returns", In Proceedings of the 17th ACM Conference on Computer and Communications Security (CCS '10) Chicago, IL, US, Oct. 4-8, 2010, pp. 559-572.
Corelan Team, "Corelan ROPDB", (month unknown) 2012, pp. 1-10, available at: https://www.corelan.be/index.php/security/corelan-ropdb/.
Cova, M., et al., "Detection and Analysis of Drive-by-Download Attacks and Malicious JavaScript Code", In Proceedings of the 19th International Conference on World Wide Web (WWW '10), Raleigh, NC, US, Apr. 26-30, 2010, pp. 281-290.
Dreger, H., et al., "Enhancing the Accuracy of Network-Based Intrusion Detection with Host-Based Context", In Proceedings of GI SIG SIDAR Conference on Detection of Intrusions and Malware and Vulnerability Assessment (DIMVA '05), Vienna, AT, Jul. 7-8, 2005, pp. 206-221.
Egele, M., et al., "Defending Browsers Against Drive-By Downloads: Mitigating Heap-Spraying Code Injection Attacks", In Proceedings of the 6th International Conference on Detection of Intrusions and Malware, and Vulnerability Assessment (DIMVA '09), Como, IT, Jul. 9-10, 2009, pp. 88-106.
Erlingsson, U., "Low-Level Software Security: Attack and Defenses", Technical Report MSR-TR-07-153, Microsoft Corporation, Nov. 2007, pp. 1-44, available at: http://research.microsoft.com/pubs/64363/tr-2007-153.pdf.
Hensing, R., "Understanding DEP as a Mitigation Technology", Microsoft, Jun. 12, 2009, pp. 1-5, available at: http://blogs.technet.com/b/srd/archive/2009/06/12/understanding-dep-as-a-mitigation-technology-part-1.aspx.
International Patent Application No. PCT/US2012/055824, filed Sep. 17, 2012.
International Preliminary Report on Patentability dated Mar. 18, 2014 in International Patent Application No. PCT/US2012/055824.
International Preliminary Report on Patentability dated Mar. 19, 2009 in International Patent Application No. PCT/US2006/015080.
International Search Report dated Jul. 7, 2008 in International Patent Application No. PCT/US2006/015080.
International Search Report dated Dec. 7, 2012 in International Patent Application No. PCT/US2012/055824.
Kruegel, C., et al., "Polymorphic Worm Detection Using Structural Information of Executables", In Proceedings of the 8th International Symposium on Recent Advances in Intrusion Detection (RAID '05), Seattle, WA, US, Sep. 7-9, 2005, pp. 207-226.
Liang, Z., et al., "Automatic Generation of Buffer Overflow Attack Signatures: An Approach Based on Program Behavior Models", In Proceedings of the 21st Annual Computer Security Applications Conference, ACSAC 2005, Tucson, AZ, US, Dec. 5-9, 2005, pp. 215-224.
Locasto, M.E., et al., "FLIPS: Hybrid Adaptive Intrusion Prevention", In Proceedings of the 8th International Symposium on Recent Advances in Intrusion Detection (RAID '05), Seattle, WA, US, Sep. 7-9, 2005, pp. 82-101.
Notice of Allowance dated Feb. 5, 2014 in U.S. Appl. No. 12/297,730.
Office Action dated Jun. 15, 2012 in U.S. Appl. No. 12/297,730.
Office Action dated Nov. 7, 2011 in U.S. Appl. No. 12/297,730.
Office Action dated Apr. 27, 2015 in U.S. Appl. No. 14/344,458.
Polychronakis, M., et al., "Comprehensive Shellcode Detection Using Runtime Heuristics", In Proceedings of the 26th Annual Computer Security Applications Conference (ACSAC '10), Austin, TX, US, Dec. 6-10, 2010, pp. 287-296.
Polychronakis, M., et al., "Emulation-Based Detection of Non-Self-Contained Polymorphic Shellcode", In Proceedings of the 10th International Conference on Recent Advances in Intrusion Detection (RAID'07), Gold Coast, AU, Sep. 5-7, 2007, pp. 87-106.
Polychronakis, M., et al., "Network-Level Polymorphic Shellcode Detection Using Emulation", In Proceedings of the Third Conference on Detection of Intrusions and Malware & Vulnerability Assessment (DIMVA '06), Berlin, DE, Jul. 13-14, 2006, pp. 54-73.
Ratanaworabhan, P., et al., "Nozzle: A Defense Against Heap-Spraying Code Injection Attacks", In Proceedings of the 18th USENIX Security Symposium, Montreal, CA, Aug. 10-14, 2009, pp. 169-186.
Shacham, H., "The Geometry of Innocent Flesh on the Bone: Return-into-Libc Without Function Calls (on the x86)", In Proceedings of the 14th ACM Conference on Computer and Communications Security (CCS '07), Alexandria, VA, US, Oct. 29-Nov. 2, 2007, pp. 552-561.
Snow, K.Z., et al, "ShellOS: Enabling Fast Detection and Forensic Analysis of Code Injection Attacks", In Proceedings of the 20th USENIX Security Symposium (SEC '11), San Francisco, CA, US, Aug. 8-12, 2011, pp. 1-16.
Solar Designer, "Getting Around Non-Executable Stack (and Fix)", Seclist.org, Aug. 10, 1997, pp. 1-7, available at: http://seclists.org/bugtraq/1997/Aug/63.
Sole, P., "Hanging on a ROPe", Presentation, Immunity.com, Sep. 20, 2010, pp. 1-41, available at: http://www.immunitysec.com/downloads/DEPLIB20_ekoparty.pdf.
Toth, T. and Kruegel, C., "Accurate Buffer Overflow Detection via Abstract Payload Execution", In Proceedings of the 5th Symposium on Recent Advances in Intrusion Detection (RAID '02) Zurich, CH, Oct. 16-18, 2002, pp. 274-291.
Tzermias, Z., et al, "Combining Static and Dynamic Analysis for the Detection of Malicious Documents", In Proceedings of the Fourth European Workshop on System Security (EUROSEC '11), Salzburg, AT, Apr. 2011, pp. 1-6.
U.S. Appl. No. 61/535,288, filed Sep. 15, 2011.
Wang, X., et al., "SigFree: A Signature-free Buffer Overflow Attack Blocker", In Proceedings of the 15th USENIX Security Symposium, Vancouver, BC, CA, Jul. 31-Aug. 4, 2006, pp. 225-240.
Written Opinion dated Dec. 7, 2012 in International Patent Application No. PCT/US2012/055824.
Written Opinion dated Jul. 7, 2008 in International Patent Application No. PCT/US2006/015080.

(56) References Cited

OTHER PUBLICATIONS

Younan, Y., et al., "A Methodology for Designing Countermeasures Against Current and Future Code Injection Attacks", In Proceedings of the 3rd IEEE International Workshop on Information Assurance, College Park, MD, US, Mar. 23-24, 2005, pp. 3-20.

Yuan, L., et al., "Security Breaches as PMU Deviation: Detecting and Identifying Security Attacks Using Performance Counters", In Proceedings of the Second Asia-Pacific Workshop on Systems (APSys'11), Shanghai, CN, Jul. 11-12, 2011, pp. 1-5.

Zhang, Q., et al., "Analyzing Network Traffic to Detect Self-Decrypting Exploit Code", In Proceedings of the 2nd ACM Symposium on Information, Computer and Communications Security (ASIACCS '07), Singapore, Mar. 20-22, 2007, pp. 4-12.

Zovi, D.A.D., "Practical Return-Oriented Programming", Presentation, RSA Conference, Mar. 17, 2010, pp. 1-41, available at: http://365.rsaconference.com/servlet/JiveServlet/previewBody/2573-102-3-3232/RR-304.pdf.

Chen, P., et al., "DROP: Detecting Return-Oriented Programming Malicious Code", In Information Systems Security, Springer Berlin Heidelberg, Dec. 14, 2009, pp. 163-177.

Davi, L., et al. "ROPdefender: A Detection Tool to Defend Against Return-Oriented Programming Attacks", Technical Report HGI-TR-2010-001, System Security Lab, Ruhr University, Bochum, DE, Mar. 19, 2010, pp. 1-21, available at: https://www.cs.jhu.edu/~s/teaching/cs460/2013-fall/ROPdefender.pdf.

Supplementary European Search Report dated Apr. 23, 2015 in European Patent Application No. 12832510.7.

Yuan, L., et al., "Security Breaches as PMU Deviation: Detecting and Identifying Security Attacks using Performance Counters", in Proceedings of the Second Asia-Pacific Workshop on Systems (APSys '11), Jul. 11, 2011, New York, NY, US, pp. 1-5.

\* cited by examiner

SYSTEMS AND METHODS FOR INHIBITING ATTACKS ON APPLICATIONS

CROSS REFERENCE TO RELATED APPLICATIONS

This application is a continuation of U.S. patent application Ser. No. 12/297,730, filed Dec. 4, 2009, which is the U.S. National Phase Application under 35 U.S.C. §371 of International Application No. PCT/US2006/015080, filed Apr. 21, 2006, which are hereby incorporated by reference herein in their entireties.

STATEMENT REGARDING FEDERALLY SPONSORED RESEARCH OR DEVELOPMENT

This invention was made with government support under Grant No. 5-21169 DA W911NF-04-1-0442 awarded by the United States Army Research Laboratory's Army Research Office (ARO). The government has certain rights in the invention.

TECHNICAL FIELD

The present invention relates to the field of computer security. More particularly, the present invention relates to systems and methods for detecting and inhibiting software attacks.

BACKGROUND

Computer viruses, worms, trojans, hackers, key recovery attacks, malicious executables, probes, etc. are a menace to users of computers connected to public computer networks (such as the Internet) and/or private networks (such as corporate computer networks). In response to these threats, many computers are protected by antivirus software and firewalls. However, these preventative measures are not always adequate. For example, there have been many instances where worms and other attacks have taken advantage of a known vulnerability in computer software (e.g., in firewall technology) the day after the public became aware of the vulnerability. Because of such a rapid launch, the patch necessary to correct the vulnerability could not be deployed in time to prevent the attack. Similar, most antivirus software relies on updates to that software so that signatures of known viruses can be utilized to recognize threats. In the case of a "zero-day" worm or virus (e.g., a worm or virus that has just been launched), most computer systems are completely vulnerable to attack because no known patch or signature update has yet been made available.

Due to the level of malicious activity on the Internet, organizations are deploying mechanisms for detecting and responding to new attacks or suspicious activity, sometimes referred to as intrusion prevention systems. However, a problem with these defense mechanisms is their inability to mount a reliable, targeted, and adaptive response to attacks. This problem is magnified when exploits are delivered by previously unseen inputs, such as zero-day attacks. A typical network defense system often includes a network-based intrusion detection system and a packet filtering firewall. Such a system has shortcomings that make it difficult for the defense system to identify, characterize, and effectively respond to new attacks.

Because intrusion detection systems passively classify information, intrusion detection systems can detect attacks but cannot respond to these attacks. Both signature-based and anomaly-based approaches that are used by intrusion detection systems to classify information merely warn that an attack may have occurred. Attack prevention is a task that is often left to a firewall, and it is usually accomplished by string matching the signatures of known malicious content or dropping packets according to site policy. Furthermore, signature matching large amounts of network traffic often requires specialized hardware and presumes the existence of accurate signatures, which often are not available. In addition, encrypted and tunneled network traffic poses a number of problems for both firewalls and intrusion detection systems as this type of traffic may inherently avoid some of their detection mechanisms. Even further, since neither intrusion detection systems nor firewalls know for sure how a packet is processed at an end host, they can make an incorrect decision.

In general, detection systems that rely solely on signatures cannot enable a defense against previously unseen attacks. On the other hand, anomaly-based classifiers can recognize new behavior, but are often unable to distinguish between previously unseen good behavior and previously unseen bad behavior. This blind spot results in a high false positive rate, even with extensively trained classifiers.

Accordingly, it is desirable to provide systems and methods that overcome these and other deficiencies of the prior art.

SUMMARY

In some embodiments, systems and methods for protecting applications from attacks (e.g., code injection attacks) are provided. Input, containing possible attacks, is received by a filtering proxy that includes at least one signature-based filter and at least one anomaly-based filter. The filter proxy grades the received input and determines whether to drop the received input or transmit it to a supervision framework. The supervision framework can emulate the application with the received input and, if it determines that the received input is an attack, the supervision framework can drop the received input and transmit instructions to update at least one of the signature-based filter and the anomaly-based filter in the filtering proxy.

Alternatively, systems and methods for protecting applications from attacks using a filtering proxy are provided. Input, containing possible attacks, is received by a filtering proxy that includes at least one signature-based filter and at least one anomaly-based filter. The filtering proxy grades the received input. Based at least in part on the grade, the filtering proxy determines whether to perform at least one of: transmitting the received input to the application, transmitting the received input to a supervision framework, and dropping the received input. If the input is transmitted to the supervision framework, the supervision framework can emulate the application with the received input. If the supervision framework determines that the received input is an attack, the supervision framework can drop the received input and transmit instructions to update at least one of the signature-based filter and the anomaly-based filter in the filtering proxy.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION

In the following description, numerous specific details are set forth regarding the systems and methods of the present invention and the environment in which such systems and methods may operate, etc., in order to provide a thorough understanding of the present invention. It will be apparent to one skilled in the art, however, that the present invention may be practiced without such specific details, and that certain features which are well known in the art are not described in detail in order to avoid complication of the subject matter of the present invention. In addition, it will be understood that the examples provided below are exemplary, and that it is contemplated that there are other methods and systems that are within the scope of the present invention.

In accordance with the present invention, systems and methods for protecting applications from attacks (e.g., code injection attacks) are provided. Input, containing possible attacks, is received by a filtering proxy that includes at least one signature-based filter and at least one anomaly-based filter. The filter proxy grades the received input and determines whether to drop the received input or transmit it to a supervision framework. The supervision framework can emulate the application with the received input and, if it determines that the received input is an attack, the supervision framework can take appropriate action (e.g., drop the received input, negate the effects of the attack by using self-healing techniques, etc.). Based at least in part on detection of attack, the supervision framework can transmit instructions to update at least one of the signature-based filter and the anomaly-based filter in the filtering proxy.

Figure 1:
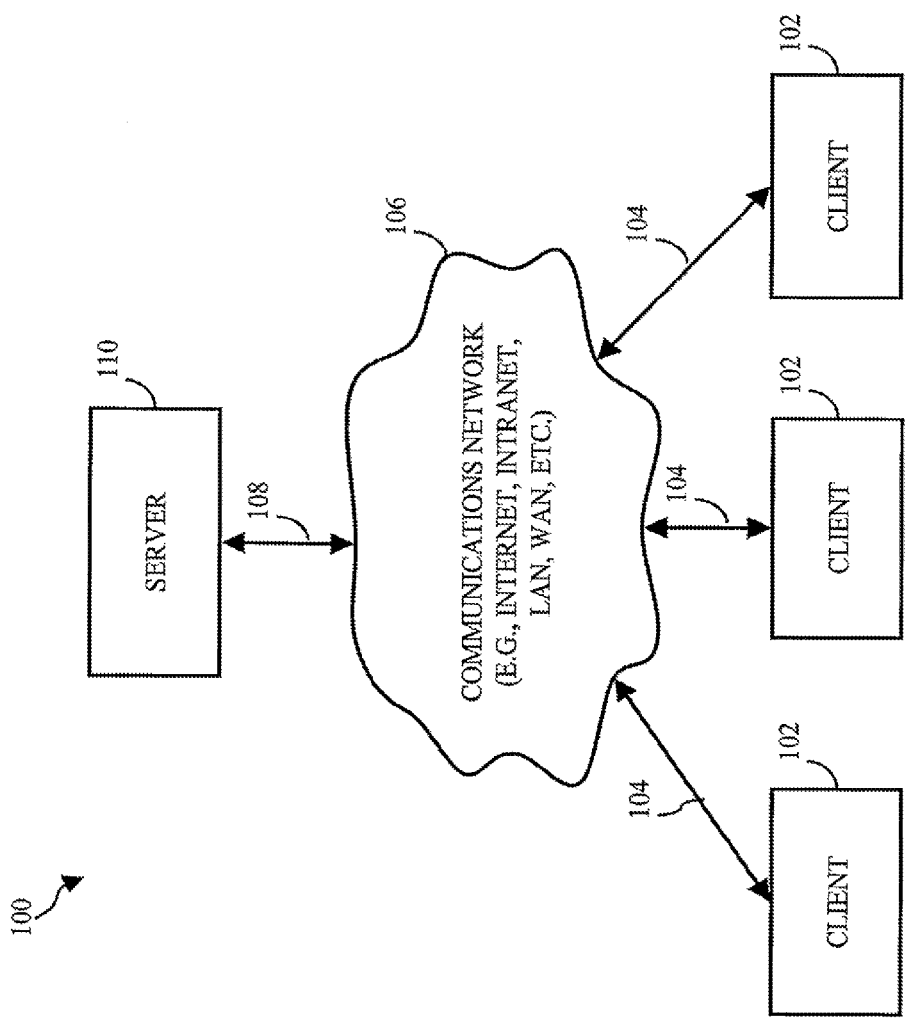
FIG. 1 is a schematic diagram of an illustrative system suitable for implementation of an application that monitors traffic and protects applications from attacks in accordance with some embodiments of the present invention.

FIG. 1 is a schematic diagram of an illustrative system 100 suitable for implementation of systems and methods for protecting an application from attack in accordance with some embodiments of the present invention. Referring to FIG. 1, an exemplary system 100 for implementing the present invention is shown. As illustrated, system 100 can include one or more clients 102. Clients 102 can be local to each other or remote from each other, and are connected by one or more communications links 104 to a communications network 106 that is linked via a communications link 108 to a server 110. Various embodiments of the present application can be implemented on at least of the server and the clients.

In system 100, server 110 can be any suitable server for executing an application, such as a processor, a computer, a data processing device, or a combination of such devices. Communications network 106 can be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 104 and 108 can be any communications links suitable for communicating data between clients 102 and server 110, such as network links, dial-up links, wireless links, hard-wired links, etc. Clients 102 can be personal computers, laptop computers, mainframe computers, dumb terminals, data displays, Internet browsers, personal digital assistants (PDAs), two-way pagers, wireless terminals, portable telephones, etc., or any combination of the same. Clients 102 and server 110 can be located at any suitable location. In one embodiment, clients 102 and server 110 can be located within an organization. Alternatively, clients 102 and server 110 can be distributed between multiple organizations.

Figure 2:
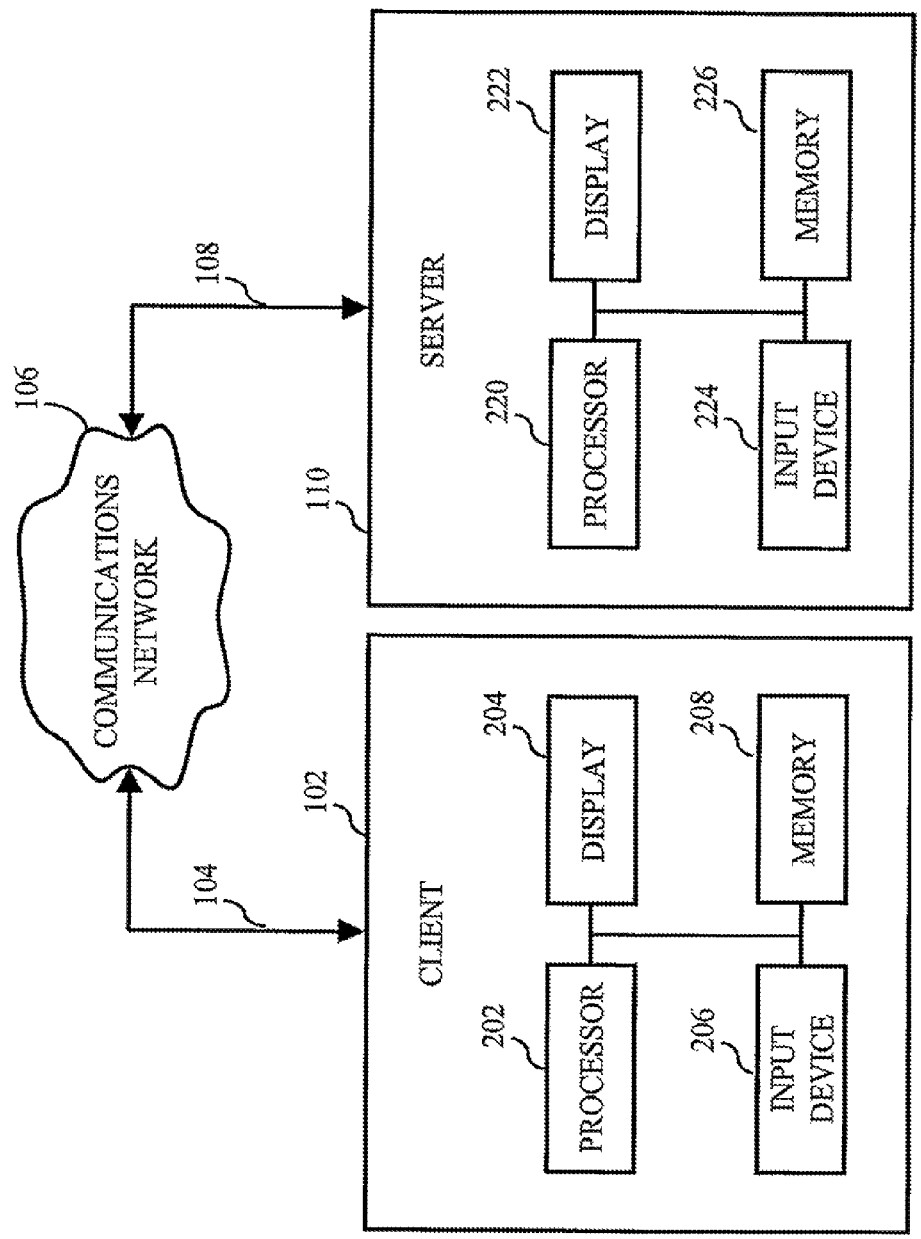
FIG. 2 is a detailed example of the server and one of the clients of FIG. 1 that may be used in accordance with some embodiments of the present invention.

The server and one of the clients, which are depicted in FIG. 1, are illustrated in more detail in FIG. 2. Referring to FIG. 2, client 102 can include processor 202, display 204, input device 206, and memory 208, which can be interconnected. In a preferred embodiment, memory 208 contains a storage device for storing a client program for controlling processor 202. Memory 208 can also contain an application for protecting at least one other application from attacks. In some embodiments, applications can be resident in the memory of client 102 or server 110.

Although the methods and systems of the present invention are described herein as being implemented on a client or server, this is only illustrative. The application can be implemented on any suitable platform (e.g., a personal computer (PC), a mainframe computer, a dumb terminal, a data display, a two-way pager, a wireless terminal, a portable telephone, a portable computer, a palmtop computer, a H/PC, an automobile PC, a laptop computer, a personal digital assistant (PDA), a combined cellular phone and PDA, etc.) to provide such features.

In some embodiments of the present invention, intrusion prevention systems and methods that can inhibit an attack from succeeding can be provided.

Generally, Instruction Set Randomization (ISR) is the process of creating a unique execution environment to negate the success of code-injection attacks. This process involves performing reversible transformation on at least a portion of the instruction set. A random key for each executable can be used to drive the transformation. The binary can then be decoded during runtime with the corresponding decoding key.

It should be noted that because an attacker crafts an exploit to match some expected execution environment and the attacker cannot easily reproduce the transformation in the exploit code, the injected exploit code can be invalidated due to the specialized execution environment. The mismatch between the language of the exploit code and the language of the execution environment causes the exploit to fail. Without knowledge of the key, otherwise valid machine instructions resolve to invalid opcodes or eventually crash the program by accessing illegal memory addresses. Instruction Set Randomization can be successful in defeating code injection attacks and can be further combined with address-space obfuscation to prevent other types of attacks.

To randomize an instruction set, the execution environment generally possesses the ability to de-randomize or decode the binary instruction stream during runtime. For machine code, the hardware can contain the decoding logic or the processor can be emulated in software. If the processor is emulated in software, then, during the application's runtime, control can freely switch between the real and the virtual processors. Selective Transactional EMulation (STEM), an instruction-level emulator that can be selectively invoked for arbitrary segments of code, can be used to provide instruction set randomization in software.

It should be noted that an attacker does not have access to the randomized binary or the key used to achieve randomization. Both the randomized binary and the key would typically be stored on a system's disk or in the system memory, and the attacker should not have access to these resources. Each system can execute binaries encoded under unique keys. Therefore a successful breach on one system does not necessarily weaken the security of other targets.

In some embodiments of the present invention, a hybrid system and method that includes an anomaly-based classifier can be provided. The classifier can incorporate feedback to tune its models for good and/or bad behavior. Additionally, precise signatures of known malicious behavior can be created and used to tune the classifier. It should be noted that any suitable classifiers can be used with the systems and methods of the present invention. One example is an anomaly detector based on PayL.

It should be noted that there are a number of suitable approaches for providing feedback to the hybrid system. For example, the feedback to email spam classifiers can be a user hitting a button in their email client that notifies the mail server to reconsider an email that was inappropriately classified as spam. This feedback loop is an example of supervised online learning and distributes the burden of supervision to users of the system.

In some embodiments of the present invention, the feedback mechanism can be automated and transparent to users. The feedback mechanism in some embodiments can facilitate unsupervised online learning. The source of information is based on an x86 emulator, such as Selective Transactional EMulation (STEM). STEM, an instruction-level emulator that can be selectively invoked for arbitrary segments of code, allows the mix of emulated and non-emulated execution inside the same process. However, it should be noted that any suitable emulator can be used in accordance with the present invention. It should also be noted that the methods and systems of the present invention are not limited to the x86 architecture but can be implemented on any suitable architecture. By selecting the pieces of the application that are emulated, the runtime overhead of the emulation can be reduced. This form of Instruction Set Randomization allows injected code to be captured and correlated with input that has been classified as anomalous.

In some embodiments, systems and methods that can assist a classifier and update a signature-based filter by using information confirming an attack are provided. By combining feedback information confirming an attack, the initial classification provided by an anomaly detector can assist in creating a signature. The signature can then be deployed to the filter to block further malicious input. These systems and methods can catch the exploit code itself, thereby allowing precise signature creation and tuning of the classifier. In another suitable embodiment, the signature can be exchanged with other systems. This exchanging of signatures can protect a network or system, apart from the system that discovered the attack, against the attack.

In some embodiments, systems and methods of the present invention can provide filtering, classification, supervision, and remediation services. The systems and methods can provide an application level firewall that can detect and stop attacks, including zero-day attacks. Zero-day attack signatures can be generated. It should be noted that zero-day attack signatures can be generated for some types of metamorphic attack input. The anomaly detector can be tuned by catching code injection attacks with a supervision component. Attacks that inject and execute code can be confirmed as malicious and be fed back to the anomaly detector and filter. The filter can then drop these confirmed attacks when they are seen. In addition, other systems that are alerted of the attack can drop the attacks the first time they see them.

Figure 3:
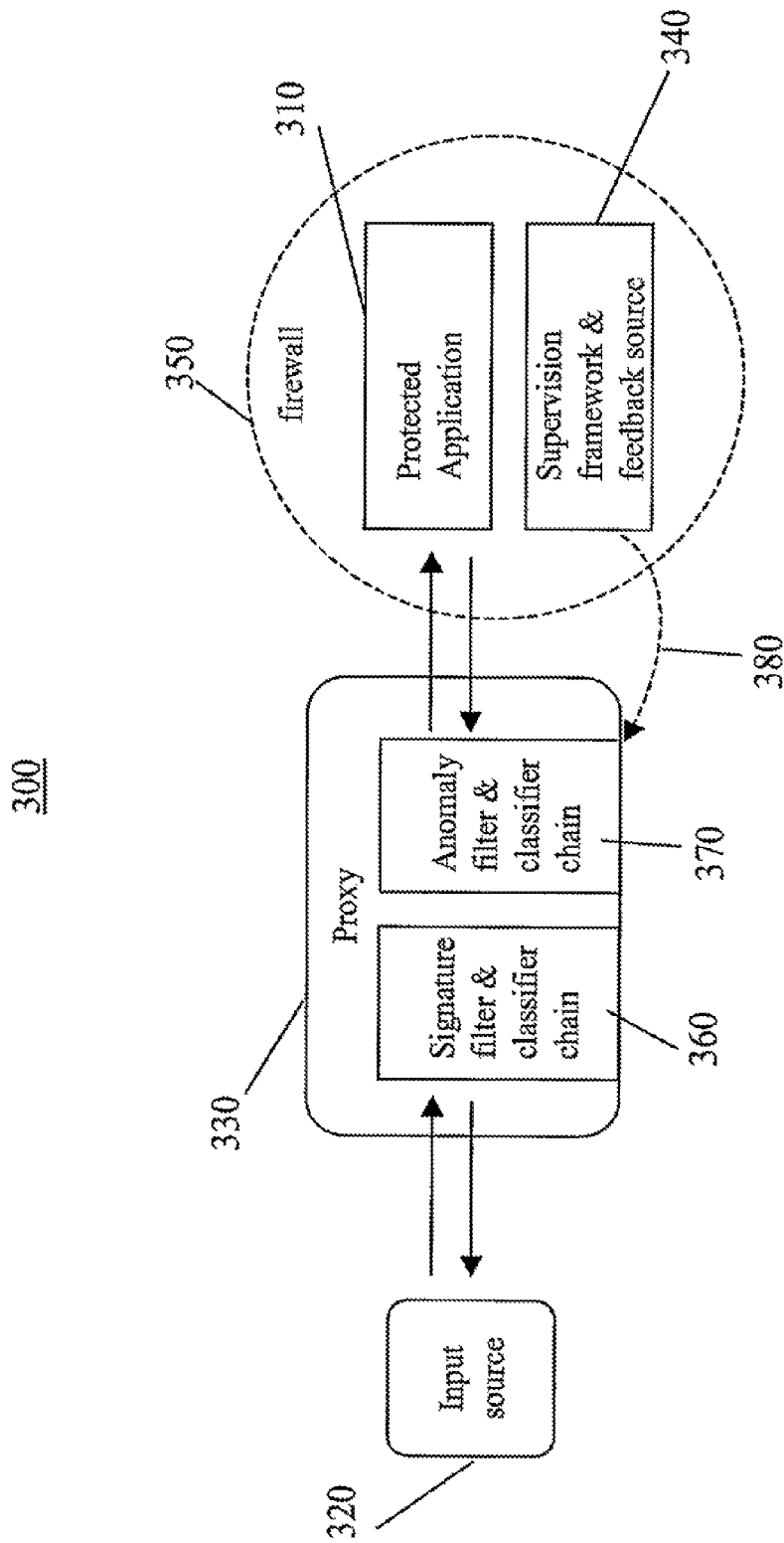
FIG. 3 is a schematic diagram of an illustrative intrusion protection system suitable for inhibiting attacks against an application in accordance with some embodiments of the present invention.

In some embodiments of the present invention, the hybrid system can include a filtering proxy and an application supervision framework. Such a hybrid system is modular and deployable across separate hosts or on a single host. FIG. 3 illustrates a schematic diagram suitable for protecting an application from attacks in accordance with some embodiments of the present invention. As shown in FIG. 3, hybrid system 300 includes a protected application 310 that is protected from an attack that enters the system from an input source 320. Input source 320 can be, for example, a connection to a local network, a connection to the Internet, a wireless network connection, any suitable wired or wireless link, a file system, a disk, a database, a portable disk, or any other suitable input source. Protected application 310 can be, for example, a server waiting for requests or a client program receiving input. Traffic directed to the protected application 310 is passed through a filtering proxy 330 and dropped if deemed malicious.

As shown in FIG. 3, hybrid system 300 also includes a supervision framework 340. If the supervision framework 340 detects an attack or determines that the protected application is behaving abnormally, supervision framework 340 transmits one or more signals to the filtering proxy 330 to update the signatures and models of the filtering proxy 330 (or one or more of the filters 360 or 370). The application can also be protected by an application level firewall 350.

As discussed herein, application level firewall 350 ensures that input or traffic from input source 320 is routed to filtering proxy 330 and not to protected application 310. This can be accomplished by in the installation of a firewall rule that redirects traffic aimed at the protected application 310 to the proxy 330 and only allows the proxy 330 to contact the protected application 310. The installation of this firewall rule is preferably done during system installation, though it can be done at other times. Some embodiments can choose to relax the constraints on allowing communication between the protected application and sources other than the proxy. However, doing so can increase the risk of undetected attack. In some embodiments, outgoing traffic can also be modeled and filtered in order to, for example, stop information leaks or the spread of self-propagating malware.

In some embodiments, filtering proxy 330 can grade or score the input from input source 320. Filtering proxy 330 can determine, for example, if the input is malicious or an attack and optionally drop the input. As shown in FIG. 3, filtering proxy 330 can be a hybrid of classification schemes, such as, a chain of one or more signature-based filters 360 and a chain of one or more anomaly filters 370. For example, the signature-based filters 360 can score and drop a request if the request matches known malicious data. The chain of anomaly filters 370 can score and drop the input if it is outside of the normal model, within the malicious model, or according to any other suitable model for determining that input is an attack.

In some embodiments, one or more of the filters (e.g., filters 360 and/or filters 370) can allow requests to pass through filtering proxy 330 even if the filters determine that the requests are anomalous or match previous malicious input. In some embodiments, the anomaly filter 370 can copy requests that the anomaly filter 370 determines to be suspicious to a cache and forward the request on to the application 310. This can be done to avoid false positives when, for example, the traffic appears anomalous but is not an attack.

Alternatively, filtering proxy 330 can grade the input from input source 320 and use the grade to determine which action to take. Based at least in part on the grade determined by filtering proxy 330, filtering proxy 330 can drop the received input, transmit the received input to supervision framework 340, transmit the received input to application 310, or perform any other suitable action. For example, if the grade determined by filtering proxy 330 is greater than a predetermined value (e.g., 80%) or if the grade determined by filtering proxy 330 is at least a given confidence level (e.g., 90% that the traffic is an attack), filtering proxy 330 can take the appropriate action. In another example, the user can be provided with the opportunity to set these levels. For example, the user may set that all inputs that are determined to have a 75% certainty of attack to be automatically dropped by the system and the user may set that all inputs that are determined to have a 50% to a 74% certainty of attack to be automatically transmitted to supervision framework 340 (e.g., for emulation). However, it should be noted that any suitable approach for using the grade to determine an action to perform can also be used. In some embodiments of the systems and methods of the present invention, the proxy 330 can be at least one of an inline proxy, a transparent inline proxy, and a firewall.

It should be noted that the feedback sent from the supervision framework 340 to the proxy 330 can be in the form of pre-computed signatures, raw data, or any suitable combination thereof. Signature generation machinery can be located in the supervision framework 340 or in the proxy 330. Any suitable communications protocols can be used to exchange information between the supervision framework 340 and the proxy 330 via the feedback connection 380 (e.g., Transmission Control Protocol/Internet Protocol (TCP/IP), Asynchronous Transfer Mode (ATM), HyperText Transfer Protocol (HTTP), Simple Object Access Protocol (SOAP), etc.).

Supervision framework 340 can also include additional features and functions. For example, framework 340 can include functions that provide approaches for stopping an exploit, automatically repairing an exploited vulnerability, and/or reporting information or feedback 380 about an exploit back to the filters (e.g., filtering proxy 330, signature filters 360, anomaly filters 370, and/or any other suitable filter or classifier). Supervision framework 340 can include a number of host-based monitors that provide a wide array of complementary feedback information to the proxy. In one example, supervision framework 340 can include Instruction Set Randomization. However, various embodiments of the present invention can include an array of other monitors in place of, or in addition to, Instruction Set Randomization. Using hybrid system 300, protected application 310 can recover from a code injection attack by simulating an error return from the emulated function after notifying filtering proxy 330 about the injected code. In some embodiments, upon the detection of an attack by the supervision framework 340 or another component (e.g., the filtering proxy 330), the protected application can be terminated and restarted.

Figure 4:
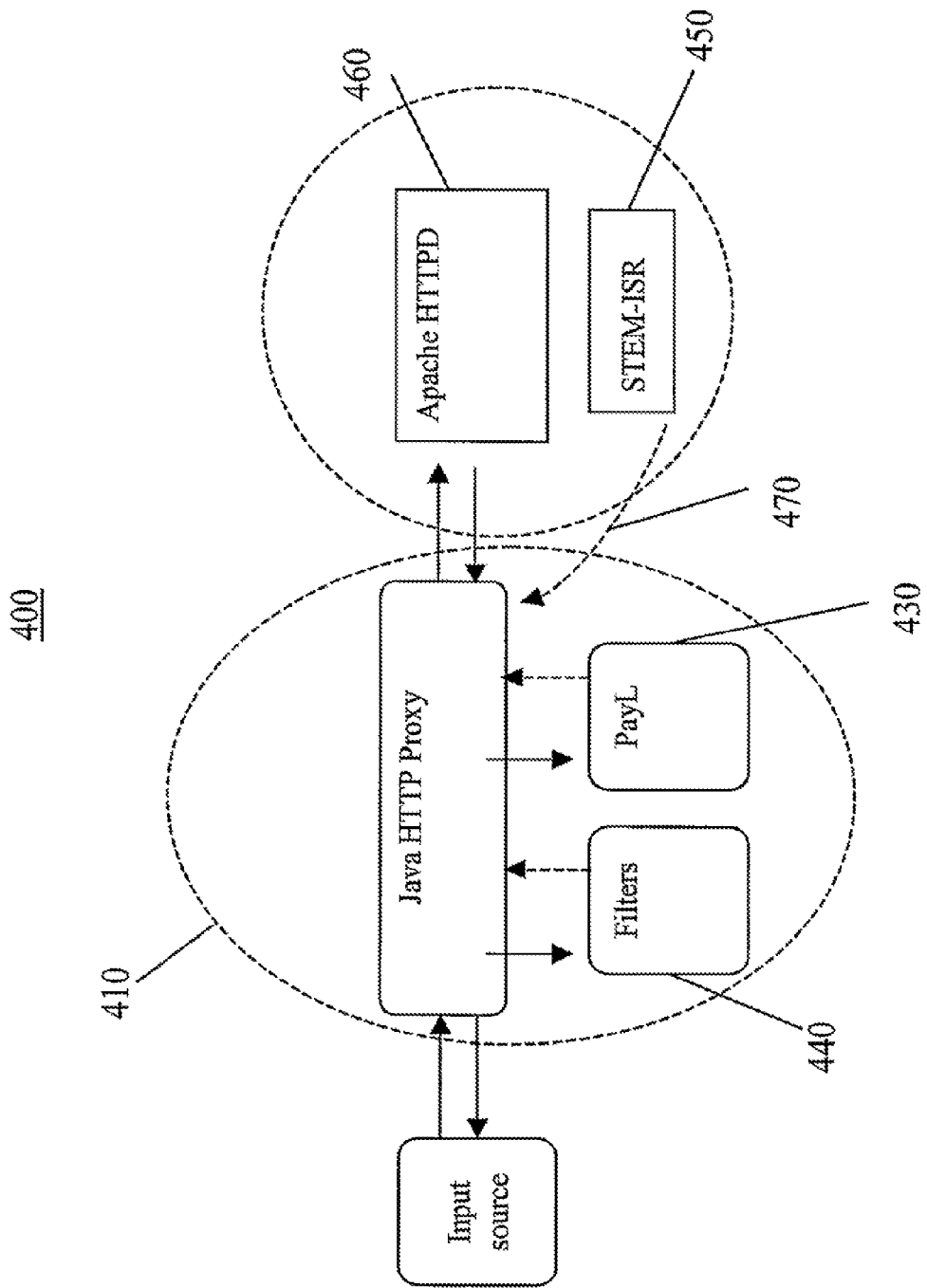
FIG. 4 is a schematic diagram of another illustrative arrangement suitable for inhibiting attacks against an application in accordance with some embodiments of the present invention.

FIG. 4 shows another illustrative arrangement for inhibiting attacks to an application in accordance with some embodiments of the present invention. As shown in FIG. 4, system 400 includes a proxy 410. Proxy 410 can be implemented in Java as an HTTP proxy. Proxy 410 can also include one or more components. For example, as shown in FIG. 4, proxy 410 includes PayL 430 and a signature-matching filter 440. It should be noted that writing proxy 410 in Java provides an implicit level of diversity for system 400 and that the small codebase of PayL 430 and the proxy 410 can be easily audited. It should be noted that in alternative embodiments, the filtering proxy can be implemented at the Operating System's stack, the virtual machine monitor's network stack (e.g., using VMware ESXServer, Xen VMM, etc.), or the network interface card. Furthermore, the proxy may be implemented on hardware or virtualized in software.

As shown in FIG. 4, system 400 also includes a supervision framework 450 and a protected application 460. In this embodiment, the supervision framework 450 is a STEM Instruction Set Randomization framework and the protected application 460 is an Apache HTTP server.

In this example, HTTP proxy 410 is a HTTP server that can spawn a new thread instance for each incoming request. During the service routine, the proxy invokes a chain of filter objects on the HTTP request. In this embodiment, the default filter implementation maintains three signature-based filters and a classifier object. PayL 430 implements the Classifier interface to provide an anomaly-based score for each HTTP request. When the proxy starts, it creates an instance of PayL 430 and provides PayL 430 with a sample traffic file to train on.

In some embodiments, the core of the filter implementation can be split between two subcomponents. A checkRequest( ) approach can be provided that performs a substantial amount of the filtering and classification work. This approach maintains four data structures to support filtering. The first of these structures is a list of "suspicious" input requests and is determined by PayL 430. This list can be a cache that provides the feedback mechanism with a starting point for matching confirmed malicious input. In some embodiments, this list may not be used to drop requests. The remaining data collections form a three level filtering scheme that trade off complexity and cost with a more aggressive filtering posture. In some embodiments, these lists are not populated by PayL 430, but rather by the feedback mechanism. The first level of filtering is direct match. This filter is less expensive, while it is also less likely to block malicious requests that are metamorphic. The second filter is a reverse lookup filter that stores requests by the score they receive from PayL 430. The last level is a longest common substring filter that provides a fairly expensive but effective means of catching malicious requests.

The second component of the filtering mechanism serves as the feedback mechanism in the proxy. It is a background thread that listens for connections from STEM that contain malicious binary code. This thread reads in a sequence of bytes and checks if the sequence matches previously seen suspicious input as classified by PayL. If not, the thread widens its scope to include a small cache of previously seen requests. Matching can be done using the longest common substring algorithm. If a match is found, then that request is used in the aforementioned filtering data structures. If not, then a new request is created and inserted into the filters based on the malicious byte sequence.

The malicious code detected by the supervision framework 340 can be in a different form than when it arrived as input to the proxy 330. As such, the feedback can need to be transformed from the form that was detected by supervision framework 340 to a form that will look similar to what the proxy 330 may see as input. In particular, code extracted from the memory space of the process or the application 310 may look substantially different than the form it arrived in at the filtering proxy 330. Instruction Set Randomization, for example, can be used to correlate input seen by the proxy 330 with behavior observed by the supervision framework 340 by pointing to the place in the application's memory space where the malicious input came to rest.

Part of the feedback and search mechanism can be to try a range of transformations on the feedback data as part of the generation of candidate signatures. One approach for locating the source of an attack is to refer to the memory address of the fault causing instruction. Another suitable approach is to keep a history of instruction pointers and perform a linear search backwards through them, while content matching a fixed or variable chunk of memory against the entries in the lists of suspicious or previously seen input maintained by the proxy. Another suitable approach is to perform a machine emulation of the code at each instruction pointer, follow the execution to the attacking code's target jump point, and capture the code at that address.

Figure 5:
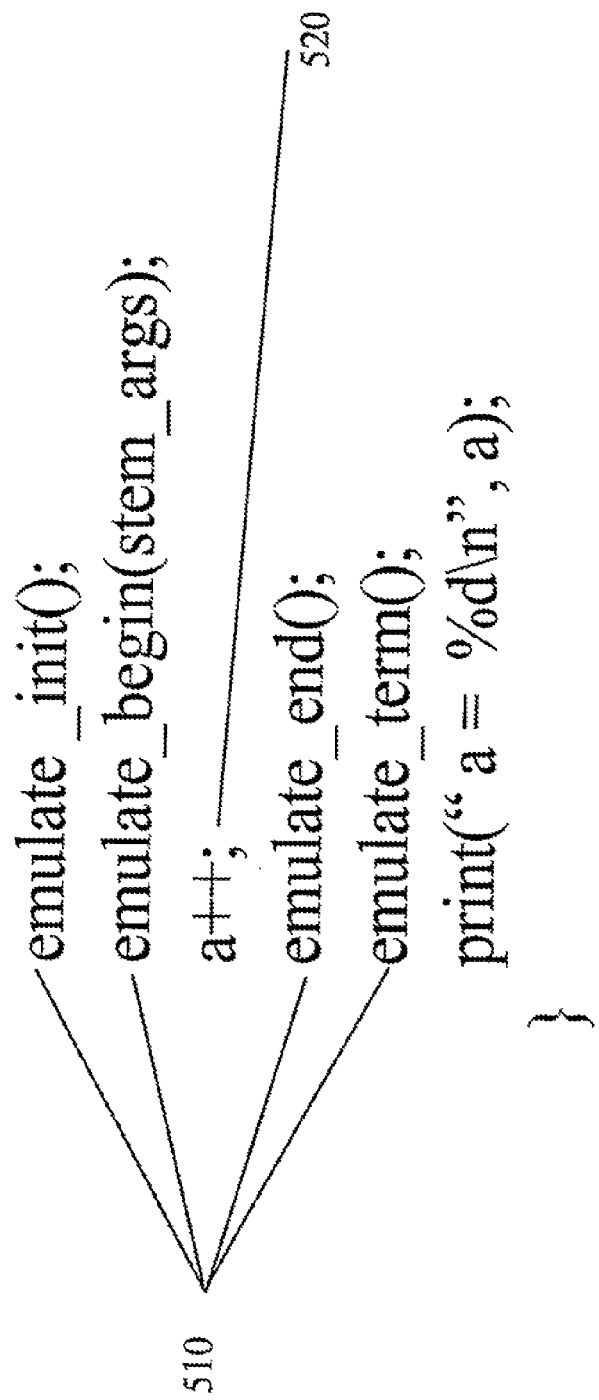
FIG. 5 is an example of a portion of C code that includes Selective Transactional Emulation (STEM) tags used in accordance with some embodiments of the present invention.

In the embodiment illustrated by FIG. 4, supervision framework 450 is an application-level library that provides an emulator capable of switching between de-randomizing the instruction stream and normal execution of the instruction stream on the underlying hardware. As shown in FIG. 5, four tags 510 can be wrapped around the segment of code 520 to be emulated. FIG. 5 shows the level of granularity that can be achieved in the switching from randomized to normal code as a single C increment statement 520 is wrapped around. As used herein, STEM can be selectively invoked for arbitrary code segments, thereby allowing the mixture of emulated and non-emulated execution inside the same process. It should be noted that, regarding performance, emulating only potentially vulnerable sections of code can offer an advantage over emulation of an entire system. This emulator allows the system to, for example, monitor for de-randomization failures when executing the instruction, undo any memory changes made by the code function inside which the fault occurred, and simulate an error return from said function. These embodiments can create a mapping between the set of errors and exceptions that may occur during a program's execution and the set of errors that are explicitly handled by the programs code.

In some embodiments, the systems and methods of the present invention also provide additional abilities and structures to STEM so that it can, for example, de-randomize an instruction stream and provide feedback 470 (FIG. 4) to the proxy 410. A loop of the emulator fetches, decodes, executes, and/or retires one instruction at a time. Before fetching an instruction, de-randomization takes place. It should be noted that because the x86 architecture contains variable-length instructions, translating enough bytes in the instruction stream is important for the success of decoding. Otherwise, invalid operations may be generated. To simplify the problem, it can be assumed that every instruction has the maximum length of 16 bytes. For every iteration of the loop of the emulator, 16-bit words are XOR'd with a 16-bit key and copied to a buffer. The fetch/decode function reads the buffer and extracts one instruction. The program counter is incremented by the exact length of the processed instruction. Of course, in cases where instructions are fifteen bytes or less, unnecessary derandomization takes place. If injected code resides anywhere along the execution path, the XOR function can convert it to an illegal opcode or an instruction that accesses an invalid memory address. If an exception occurs during emulation, the enhanced STEM notifies the proxy of the code at the instruction pointer. The enhanced STEM captures a portion of code (e.g., 1 KB, 2 KB, the average length of the payload observed by the proxy, etc.) and opens a simple TCP socket to the proxy, where the address and port of the feedback mechanism were included in the startup options of the emulate_begin( )function. Finally, the enhanced STEM then simulates an error return from the function it was invoked in.

It should be noted that these methods and systems have been designed to require little management beyond installation and initial training. It should also be noted that the systems and methods can be implemented in a twin system or a honeypot that receives a copy of input meant for another host.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, can readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention can be made without departing from the spirit and scope of the invention, which is limited only by the claims which follow.

What is claimed is:

1. A method for protecting applications from attacks, the method comprising:
receiving input from an input source that is attempting to reach an application over a communication network;
transmitting the received input to a supervision framework that detects an attack on the application and provides feedback relating to the attack to at least one of a signature-based filter and an anomaly-based filter;
using the supervision framework to emulate the application with the received input, wherein the emulation further comprises implementing Instruction Set Randomization (ISR) by performing a reversible transformation on at least a portion of the received input by the supervision framework;
receiving an indication from the supervision framework that the received input is the attack based on the emulation; and
in response to receiving the indication, inhibiting the received input from being transmitted to the application and transmitting instructions relating to the attack that updates at least one of the signature-based filter and the anomaly-based filter.

2. The method of claim 1, wherein the attack is a code injection attack.

3. The method of claim 1, wherein the updating the at least one of the signature-based filter and the anomaly based filter further comprises updating at least one of models, predictors, signatures, and classifiers associated with the filters.

4. The method of claim 1, wherein the signature-based filter determines whether to drop the received input in response to matching known malicious data.

5. The method of claim 1, wherein the anomaly-based filter determines whether to drop the received input in response to determining that the received input is outside of a normal model.

6. The method of claim 1, wherein the instructions comprise at least one transformation from the attack detected in the application to the input received from the input source.

7. The method of claim 1, wherein the instructions comprise an association between the attack detected in the application and the input received from the input source.

8. The method of claim 1, further comprising determining that the application is behaving abnormally based on the emulation.

9. A system for protecting applications from attacks, the system comprising:
a hardware processor that is programmed to:
receive input from an input source that is attempting to reach an application over a communication network;
transmit the received input to a supervision framework that detects an attack on the application and provides feedback relating to the attack to at least one of a signature-based filter and an anomaly-based filter;
use the supervision framework to emulate the application with the received input, wherein the emulation further comprises implementing Instruction Set Randomization (ISR) by performing a reversible transformation on at least a portion of the received input;
receive an indication from the supervision framework that the received input is the attack based on the emulation; and
in response to receiving the indication, inhibit the received input from being transmitted to the application and transmit instructions relating to the attack that updates at least one of the signature-based filter and the anomaly-based filter.

10. The system of claim 9, wherein the attack is a code injection attack.

11. The system of claim 9, wherein the updating the at least one of the signature-based filter and the anomaly based filter further comprises updating at least one of models, predictors, signatures, and classifiers associated with the filters.

12. The system of claim 9, wherein the signature-based filter determines whether to drop the received input in response to matching known malicious data.

13. The system of claim 9, wherein the anomaly-based filter determines whether to drop the received input in response to determining that the received input is outside of a normal model.

14. The system of claim 9, wherein the instructions comprise at least one transformation from the attack detected in the application to the input received from the input source.

15. The system of claim 9, wherein the instructions comprise an association between the attack detected in the application and the input received from the input source.

16. The system of claim 9, wherein the hardware processor is further programmed to determine that the application is behaving abnormally based on the emulation.

17. A non-transitory computer-readable medium containing computer executable instructions that, when executed by a processor, cause the processor to perform a method for protecting applications from attacks, the method comprising:
receiving input from an input source that is attempting to reach an application over a communication network;
transmitting the received input to a supervision framework that detects an attack on the application and provides feedback relating to the attack to at least one of a signature-based filter and an anomaly-based filter;
using the supervision framework to emulate the application with the received input, wherein the emulation further comprises implementing Instruction Set Randomization (ISR) by performing a reversible transformation on at least a portion of the received input by the supervision framework;
receiving an indication from the supervision framework that the received input is the attack based on the emulation; and
in response to receiving the indication, inhibiting the received input from being transmitted to the application and transmitting instructions relating to the attack that updates at least one of the signature-based filter and the anomaly-based filter.

* * * * *